United States Patent [19]

Aydin et al.

[11] Patent Number: 5,436,289

[45] Date of Patent: * Jul. 25, 1995

[54] AQUEOUS POLYMER DISPERSION HAVING A BROAD PARTICLE DISTRIBUTION

[75] Inventors: Oral Aydin, Mannheim; Michael Portugall, Wachenheim; Josef Neutzner, Neustadt; Walter Maechtle, Ludwigshafen, all of Germany

[73] Assignee: BASF Aktiengesellschaft, Ludwigshafen, Germany

[*] Notice: The portion of the term of this patent subsequent to Jun. 20, 2012 has been disclaimed.

[21] Appl. No.: 220,687

[22] Filed: Mar. 31, 1994

Related U.S. Application Data

[62] Division of Ser. No. 51,654, Apr. 26, 1993, Pat. No. 5,340,859.

[30] Foreign Application Priority Data

Apr. 29, 1992 [DE] Germany ............... 42 13 968.6

[51] Int. Cl.$^6$ .................................... C08L 13/02
[52] U.S. Cl. ................... 524/457; 524/458; 524/460; 524/555; 524/556; 524/560; 524/162
[58] Field of Search ............. 524/457, 458, 460, 555, 524/556, 558, 560, 159, 161, 162

[56] References Cited

U.S. PATENT DOCUMENTS

| | | | |
|---|---|---|---|
| 3,424,706 | 1/1969 | Smith et al. | 524/466 |
| 4,123,403 | 10/1978 | Warner et al. | 524/558 |
| 4,322,328 | 3/1982 | Gratz et al. | 524/558 |

Primary Examiner—Jeffrey T. Smith
Attorney, Agent, or Firm—Oblon, Spivak, McClelland, Maier & Neustadt

[57] ABSTRACT

An aqueous polymer dispersion with a solids volume concentration of at least 50% by volume is obtainable by polymerizing monomers by the method of free radical aqueous emulsion polymerization with the addition of at least two starting polymer dispersions, of which one contains not only particularly finely divided but also coarsely divided polymer particles.

14 Claims, No Drawings

AQUEOUS POLYMER DISPERSION HAVING A BROAD PARTICLE DISTRIBUTION

This is a division of application Ser. No. 08/051,654, filed on Apr. 26, 1993 now U.S. Pat. No. 5,340,859.

The present invention relates to a final aqueous polymer dispersion which has a solids volume concentration (solids volume=solids mass divided by solids density) of at least 50% by volume and is obtainable by polymerizing at least one radical polymerizable monomer with the addition of at least one aqueous starting dispersion I of a starting polymer I and with the addition of at least one aqueous starting dispersion II of a starting polymer II in a polymerization vessel by the method of free radical aqueous emulsion polymerization in the presence of surface active substances and free radical polymerization initiators with the proviso that a) the starting polymer I is present in the at least one aqueous starting dispersion I in the form of dispersed starting polymer particles of whose total mass at least 1% by weight has a non-zero particle diameter $\leq 50$ nm and at least 65% by weight has a particle diameter $\geq 300$ nm, b) the mass of the at least one starting polymer I added relative to the total mass formed of the mass of the at least one radical polymerizable monomer and of the masses of starting polymers I, II added in the form of aqueous starting dispersions I, II is from 2 to 60% by weight, c) the mass of the at least one starting polymer II added relative to the total mass formed of the mass of the at least one radical polymerizable monomer and of the mass of starting polymers I, II added in the form of aqueous starting dispersions I, II is at most 15% by weight, d) of the total amount of the at least one aqueous starting dispersion I to be added the amount introduced into the polymerization vessel as initial charge prior to the start of the free radical aqueous emulsion polymerization is nil, e) the total amount of the at least one aqueous starting dispersion II to be added is introduced into the polymerization vessel as initial charge prior to the start of the free radical aqueous emulsion polymerization, f) of the total amount of the at least one monomer to be polymerized the proportion introduced into the polymerization vessel as initial charge prior to the start of the free radical aqueous emulsion polymerization is nil, g) the total amount of the at least one monomer to be polymerized is added to the polymerization vessel from the start of the free radical aqueous emulsion polymerization in such a way that at any time of this addition the polymerization conversion of the total monomers already added previously to the polymerization vessel is at least 80 mol %, h) at any time after the start of the free radical aqueous emulsion polymerization the ratio V of the number of moles of the particles of starting polymer I already added previously to the polymerization vessel in the form of the at least one aqueous starting dispersion I to the number of moles of the amount already added previously to the polymerization vessel of the at least one monomer to be radical polymerized, standardized for the ratio of the number of moles of the total starting polymer particles to be added in the form of the at least one aqueous starting dispersion I to the number of moles of the total amount of monomers to be radical polymerized, is within the range from >0 to 10, i) on completion of the addition of the total amount to be added of the at least one aqueous starting dispersion I additionally at most 20 mol % of the total amount of the at least one monomer to be radical polymerized is added to the polymerization vessel, j) the at least one aqueous starting dispersion I to be added contains at least 1–6% by weight, based on its starting polymer I content, of surface active substances, k) the at least one aqueous starting dispersion II to be added contains at least 1–6% by weight, based on its starting polymer II content, of surface active substances, l) the final aqueous polymer dispersion contains from 1 to 6% by weight of the surface active substances, based on the total mass formed of the mass of the at least one radical polymerizable monomer and of the masses of starting polymers I, II to be added in the form of aqueous starting dispersions I, II, m) the amount of surface active substances contained in the polymerization vessel at any time from the start of the free radical aqueous emulsion polymerization minus the minimum amounts mentioned under j), k) of surface active substances introduced into the polymerization vessel is less than 5% by weight, based on the monomers already added previously to the polymerization vessel, and n) the total amount used of free radical polymerization initiators is from 0.1 to 5% by weight, based on the total amount of the at least one monomer to be radical polymerized, and is added to the polymerization vessel in the course of the free radical aqueous emulsion polymerization in such a way that the free radical aqueous emulsion polymerization continues to a minimum polymerization conversion of the total amount of the at least one monomer to be polymerized of at least 90 mol %.

The present invention further relates to the process for preparing such a final aqueous polymer dispersion and to the use thereof as binder and as material for preparing coatings and adhesive joints.

Aqueous polymer dispersions are systems comprising polymer particles dispersed as disperse phase in an aqueous dispersion medium.

Polymer solutions form polymer films as the solvent evaporates. Aqueous polymer dispersions behave the same way on evaporation of the aqueous dispersion medium, which is why aqueous polymer dispersions find varied use as binders, for example for paints or for leather coatings.

Aqueous polymer dispersions having a high polymer content are of particular advantage in that, on the one hand, their relatively lower proportion of aqueous dispersion medium reduces the energy required for evaporating it, for example for film formation or for preparing polymer powders, and, on the other, the useful polymer can be stored and transported using a relatively smaller amount of aqueous phase as carrier medium.

However, there is a disadvantage in that, as the volume concentration of the polymer increases (U.S. Pat. No. 4,130,523), there are problems with the preparation of aqueous polymer dispersions. For instance, the flow resistance (viscosity) increases and this increased viscosity makes it difficult not only to remove the heat of reaction but also to process the aqueous dispersion; secondly, there is an increasing tendency for the dispersed polymer particles to aggregate for reasons of thermodynamic stability. The resulting flocs [a) microflocs or specks; not normally removable by conventional filtration; b) macroflocs or coagulum; normally removable by conventional filtration] interfere in particular with the film forming of the aqueous polymer dispersions and are therefore generally undesirable.

According to studies about the flow resistance of aqueous polymer dispersions, those having a broad size distribution (polydispersity) of the dispersed polymer particles for the same solids content generally have a lower flow resistance than those with a narrow size distribution (which are in the extreme case monodispersed). Furthermore, coarse aqueous polymer dispersions have a lower flow resistance than fine aqueous polymer dispersions, given the same solids content.

EP-A-129 699 discloses a process for preparing an aqueous polymer dispersion wherein unsaturated monomers are polymerized in a conventional manner in a polymerization vessel by the method of free radical aqueous emulsion polymerization with the addition of an aqueous dispersion of a starting polymer such that the addition of the aqueous dispersion of the starting polymer must be concluded before 40% by weight of the total monomers to be polymerized have copolymerized and must not start before the average particle size of the emulsion polymer formed in the course of the polymerization of the monomers is twice that of the aqueous dispersion of the starting polymer. In fact, the aqueous dispersion of the starting polymer is preferably not added over a prolonged period but all at once.

The disadvantages of the aqueous polymer dispersions thus obtainable are that their flow resistance is not fully satisfactory above a solids volume concentration of 50% by volume and that, according to the embodiment examples, the solids volume concentration is limited to values below 65% by volume.

U.S. Pat. No. 4,130,523 concerns a process for preparing aqueous polymer dispersions wherein aqueous polymer dispersion already formed in the course of the polymerization process is continuously removed from the reaction zone, stored and later reintroduced into the reaction zone as a kind of starting polymer dispersion. A disadvantage of this process is that it is unsuitable for industrial implementation.

U.S. Pat. No. 3,424,706 concerns a process for preparing aqueous dispersions of polymers containing at least 70–97% by weight of vinylidene chloride as copolymerized units, wherein the polymerization of the monomers is effected with the addition of an aqueous dispersion of a starting polymer. The said reference teaches inter alia mixing the monomers to be polymerized and the aqueous dispersion of the starting polymer with one another and adding this mixture to the initial charge comprising part of the polymerization batch.

The disadvantage with this process is that it is restricted to monomer mixtures consisting chiefly of vinylidene chloride. Moreover, according to the illustrative embodiments, the aqueous polymer dispersions obtainable by this process are unsatisfactory not only as regards the flow resistance above a solids volume concentration of 50% by volume but also as regards the upper limit for the solids volume concentration attainable in a still satisfactorily flowable state.

It is an object of the present invention to make available aqueous polymer dispersions that are obtainable in a simple, industrially suitable, reproducible manner not restricted to specific monomers with an increased solids volume concentration but a reduced flow resistance and reduced floc content.

We have found that this object is achieved by the final aqueous polymer dispersions defined at the beginning.

Remarkably, the subject-matter of the invention is not restricted to the free radical aqueous emulsion polymerization of monomer mixtures composed chiefly or exclusively of vinyl and/or vinylidene halides, despite the generally known fact that the development of the disperse phase in the case of monomers other than vinyl and/or vinylidene halides is a significantly more complex phenomenon.

Suitable radical polymerizable monomers for the process of the invention are therefore in particular, inter alia, monoethylenically unsaturated monomers such as olefins, for example ethylene, aromatic vinyl monomers such as styrene, $\alpha$-methylstyrene, o-chlorostyrene or vinyltoluenes, vinyl and vinylidene halides such as vinyl and vinylidene chloride, esters of vinyl alcohol and monocarboxylic acids having from 1 to 18 carbon atoms, such as vinyl acetate, vinyl propionate, vinyl-n-butyrate, vinyl laurate and vinyl stearate, esters of $\alpha$, $\beta$-monoethylenically unsaturated mono- and dicarboxylic acids preferably of from 3 to 6 carbon atoms, such as, in particular, acrylic acid, methacrylic acid, maleic acid, fumaric acid and iraconic acid, with alkanols in general of from 1 to 12, preferably of from 1 to 8, in particular of from 1 to 4, carbon atoms, such as, in particular, methyl, ethyl, n-butyl, isobutyl and 2-ethylhexyl acrylate and methacrylate, dimethyl maleate or n-butyl maleate, nitriles of $\alpha$, $\beta$-monoethylenically unsaturated carboxylic acids such as acrylonitrile and also $C_{4-8}$-conjugated dienes such as 1,3-butadiene and isoprene. The monomers mentioned generally form the principal monomers which, based on the total amount of the monomers to be polymerized by the method of free radical aqueous emulsion polymerization, normally account for a proportion of more than 50% by weight. Monomers which polymerized by themselves normally form homopolymers that possess enhanced water solubility are normally included in the polymer only as modifying monomers, in amounts, based on the total amount of monomers to be polymerized, of less than 50% by weight, in general from 0.5 to 20, preferably from 1 to 10, % by weight.

Examples of monomers of this type are $\alpha$, $\beta$-monoethylenically unsaturated mono- and dicarboxylic acids of from 3 to 6 carbon atoms and amides thereof, e.g. acrylic acid, methacrylic acid, maleic acid, fumaric acid, itaconic acid, acrylamide and methacrylamide, also vinyl-sulfonic acid and water-soluble salts thereof, and also N-vinylpyrrolidone. Monomers which customarily enhance the internal strength of the films formed from the final aqueous polymer dispersion are in general likewise included in the polymer only in minor amounts, usually from 0.5 to 10% by weight, based on the total amount of monomers to be polymerized. Monomers of this type normally have an epoxy, hydroxyl, N-methylol, carbonyl or at least two nonconjugated ethylenically unsaturated double bonds. Examples thereof are N-alkylolamides of $\alpha$, $\beta$-monoethylenically unsaturated carboxylic acids of from 3 to 10 carbon atoms and esters thereof with alcohols of from 1 to 4 carbon atoms, of which N-methylolacrylamide and N-methylolmethacrylamide are very particularly preferred, divinyl monomers, divinylidene monomers and also dialkenyl monomers. Particularly suitable instances of these are the diesters of dihydric alcohols with α,β-monoethylenically unsaturated monocarboxylic acids, of which in turn acrylic and methacrylic acid are preferred. Examples of such monomers having two nonconjugated ethylenically unsaturated double bonds are alkylene glycol diacrylates and dimethacrylates such as ethylene glycol diacrylate, 1,3-butylene glycol diacrylate, 1,4-butylene glycol diacrylate, propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate and triallyl cyanurate. In this connection of particular importance are also $C_1$–$C_8$-hydroxyalkyl methacrylate and acrylate, such as n-hydroxyethyl, n-hydroxypropyl or n-hydroxybutyl acrylate and methacrylate, and also compounds such as diacetoneacrylamide and acetylacetoxyethyl acrylate or methacrylate. As well as monomers having unsaturated double bonds it is possible for minor amounts, customarily from 0.01 to 2% by weight, based on the monomers to be polymerized, of molecular weight regulators, such as tert-dodecyl mercaptan and 3-mercaptopropyltrimethoxysilane to be included in the polymer. It is preferable to add such substances to the polymerization zone mixed with the monomers to be polymerized.

Suitable surface active substances include not only the protective colloids customarily used for carrying out free radical aqueous emulsion polymerizations but also emulsifiers. Examples of suitable protective colloids are polyvinyl alcohols, cellulose derivatives and vinylpyrrolidone-containing copolymers. A detailed description of further suitable protective colloids may be found in Houben-Weyl, Methoden der organischen Chemie, Volume XIV/1, Makromolekulare Stoffe, Georg Thieme Verlag, Stuttgart, 1961, pages 411 to 420. It is of course also possible to use mixtures of emulsifiers and/or protective colloids. Preferably, the surface active substances used are exclusively emulsifiers whose relative molecular weights are customarily below 1000, in contradistinction to the protective colloids. They can be anionic, cationic or nonionic in nature. Of course, if mixtures of surface active substances are used, the individual components must be compatible with one another, which can be verified beforehand by means of a few preliminary experiments if there is any doubt. In general, anionic emulsifiers are compatible with one another and with nonionic emulsifiers. The same is true of cationic emulsifiers, while anionic and cationic emulsifiers are usually incompatible with one another. Examples of customary emulsifiers are ethoxylated mono-, di- and trialkylphenols (EO degree: 3–50, alkyl radical: $C_4$–$C_9$), ethoxylated fatty alcohols (EO degree: 3–50, alkyl radical: $C_8$–$C_{36}$), and also alkali metal and ammonium salts of alkyl sulfates (alkyl radical: $C_8$–$C_{12}$), of sulfuric monoesters of ethoxylated alkanols (EO degree: 4–30, alkyl radical: $C_{12}$–$C_{18}$), and ethoxylated alkylphenols (EO degree: 3–50, alkyl radical: $C_4$–$C_9$), of alkylsulfonic acids (alkyl radical: $C_{12}$–$C_{18}$) and of alkylarylsulfonic acids (alkyl radical: $C_9$–$C_{18}$). Further suitable emulsifiers may be found in Houben-Weyl, Methoden der organischen Chemie, Volume XIV/1, Makromolekulare Stoffe, Georg Thieme Verlag, Stuttgart, 1961, pages 192 to 208.

Particularly suitable surface active substances are compounds of the general formula I

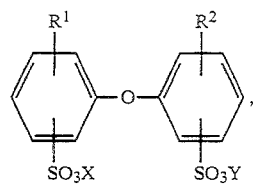

where $R^1$ and $R^2$ are each hydrogen or $C_4$–$C_{24}$-alkyl but are not both hydrogen, and X and Y are each an alkali metal or ammonium ion In the formula I, $R^1$ and $R^2$ are each preferably linear or branched alkyl radicals of from 6 to 18 carbon atoms or hydrogen, in particular of 6, 12 and 16 carbon atoms, but $R^1$ and $R^2$ must not both be hydrogen. X and Y are each preferably sodium, potassium or ammonium ions, of which sodium is particularly preferred. Of particular advantage are compounds I in which X and Y are each sodium, $R^1$ is a branched alkyl radical of 12 carbon atoms and $R^2$ is hydrogen or $R^1$. It is common to employ technical grade mixtures containing from 50 to 90% by weight of the monoalkylated product, for example Dowfax® 2A1 (trademark of the Dow Chemical Company). In the process of the invention compounds I are preferably used as the sole surface active substances and particularly preferably in mixture with ethoxylated fatty alcohols (EO degree: 3–50, alkyl radical: $C_8$–$C_{36}$). Compounds I are generally known, for example from U.S. Pat. No. 4,269,749, and are commercially available. It is advantageous for the final aqueous polymer dispersion of the invention to contain from 1 to 3% by weight of surface active substances, based on the mass of the final polymer.

Suitable free radical polymerization initiators are all those which are capable of initiating a free radical aqueous emulsion polymerization. This includes not only peroxides, for example alkali metal peroxodisulfates, but also azo compounds. Preference is given to using combined systems composed of at least one organic reducing agent and at least one peroxide and/or hydroperoxide, e.g. tert-butyl hydroperoxide and the sodium salt of hydroxymethanesulfinic acid or hydrogen peroxide and ascorbic acid, and very particular preference is given to combined systems which in addition contain a small amount of a metal compound that is soluble in the polymerization medium and whose metallic component can exist in a plurality of valence states, for example ascorbic acid/iron(II) sulfate/hydrogen peroxide, although instead of ascorbic acid it is also common to employ the sodium salt of hydroxymethanesulfinic acid, sodium sulfite, sodium bisulfite or sodium metabisulfite and instead of hydrogen peroxide it is common to employ tert-butyl hydroperoxide or alkali metal peroxodisulfates and/or ammonium peroxodisulfate. Instead of a water-soluble iron(II) salt it is common to employ a combination of water-soluble Fe/V salts. The amount of free radical initiator system used is preferably from 0.1 to 2% by weight, based on the total amount of monomers to be polymerized.

The manner of addition of the free radical initiator system to the polymerization vessel in the course of the free radical aqueous emulsion polymerization of the invention is rather of minor importance for the success of the process of the invention. The initiator system can not only be introduced into the polymerization vessel in its entirety as part of the initial charge but also be added continuously or stepwise in the course of the free radical aqueous emulsion polymerization at the rate of its consumption. The choice in a particular case depends in the usual fashion not only on the chemical nature of the initiator system but also on the polymerization temperature.

The polymerization pressure and the polymerization temperature are likewise of rather minor importance. In general, the temperature employed will be between room temperature and 100° C. preferably within the range from 50° to 95° C. The employment of superatmospheric or reduced pressure is possible, so that the polymerization temperature may also exceed 100° C. and may in fact be as high as 130° C. Volatile monomers such as ethylene, butadiene or vinyl chloride are preferably polymerized under superatmospheric pressure. To control the pH of the polymerization medium ammonia or sulfuric acid, for example, may be added during the free radical aqueous emulsion polymerization of the invention. A further customary auxiliary is the sodium salt of ethylenediaminetetraacetic acid.

The radical polymerizable monomers mentioned by way of example as suitable for the free radical aqueous emulsion polymerization of the invention are suitable not only for use as constituents of the monomer mixture to be polymerized according to the invention, but also, in the same way as the polymerization initiators, molecular weight regulators and pH regulators recommended for the free radical aqueous emulsion polymerization of the invention, for use as constituents of the starting polymers I, II and of the starting dispersions containing these, although the monomer, regulator and initiator composition for the preparation of the aqueous starting dispersions I, II can be not only congruent with but also different from that for the process of the invention. This applies mutatis mutandis necessarily also to the surface active substances to be used for preparing the aqueous starting dispersions I, II, since in the process of the invention, relative to the amounts of starting polymers I and II, in each case at least 1–6% by weight of the surface active substances finally contained in the final aqueous polymer dispersion of the invention are already part of the aqueous starting dispersions I, II to be added. The amounts of surface active substances are in general the minimum amounts required for preparing stable aqueous starting dispersions I, II. The statements about the polymerization pressure and temperature also apply.

Aqueous starting dispersions I to be added according to the invention of at least one starting polymer I in which the starting polymer I is present in the form of dispersed starting polymer particles of whose total mass at least 1% by weight has a non-zero particle diameter $\leq 50$ nm and at least 65% by weight has a particle diameter $\geq 300$ nm are obtainable in a simple manner for example by adding together an essentially monodisperse finely divided aqueous starting dispersion III of a dispersed starting polymer III having a weight average particle diameter $\bar{d}_w \leq 50$ nm, preferably 20–50 nm, and a coarsely divided aqueous starting dispersion IV of a dispersed starting polymer IV having a corresponding proportion of polymer particles having a particle diameter $\geq 300$ nm. The adding together may also be effected by adding the starting dispersions III, IV to the polymerization vessel containing the polymerization according to the invention by spatially separate means and thus only combining them to form an aqueous starting dispersion I within the polymerization vessel.

In general, the particle diameters of the aqueous starting dispersion I are $\leq 2000$ nm.

Aqueous starting dispersions III are obtainable in a conventional manner. Appropriate teaching may be found for example in Houben-Weyl, Methoden der organischen Chemie, Volume E 20, part I, Makromolekulare Stoffe, Georg Thieme Verlag, Stuttgart, 1987, pages 248 to 268. If the solids content is to be a preferred 20–40% by weight, the starting dispersions III are obtainable in a particularly simple manner, for example by mixing together the aqueous phase, the monomers, the free radical initiators (normally from 0.1 to 5% by weight, based on the amount of starting monomers to be polymerized), and surface active substances (customarily from 10 to 50% by weight, based on the starting monomers to be polymerized) at a low temperature and heating the mixture to the polymerization temperature and polymerizing it (the particle diameter $\bar{d}_w$ generally decreases with increasing surface active substance). In another version, the initial charge comprises essentially all the components, but part of the polymerization initiator is added continuously after the charge has been heated to the reaction temperature and while it is maintained at that temperature.

Starting dispersions IV are likewise obtainable in a manner known per se to one skilled in the art. Essentially, they can be prepared in the same way as the starting dispersions III except for the difference that the amount of surface active substances used relative to the monomers to be polymerized is in general merely 1–5% by weight. Preferred starting dispersions IV are those which have a broad particle size distribution. For instance, at least 25% by weight of the starting polymer particles IV should have a particle diameter of below 300 nm. Suitable for use as these starting dispersions IV are inter alia final aqueous polymer dispersions of DE-A-4 213 965 (O.Z. 0050/43182) and of DE-A-4 213 967 (O.Z. 0050/43184). Normally, the starting dispersions IV have a solids content of above 50% by weight.

Preference is given to adding the starting dispersions III and IV together in such amounts that of the total mass of the starting polymer particles I of the resulting aqueous starting dispersion I not more than 10% by weight have a non-zero particle diameter $\leq 50$ nm.

The use of the aqueous starting dispersions II is not essential, but has technical advantages. Accordingly, no particular requirements are specified for the starting dispersion II. It is preferably an aqueous polymer dispersion having a broad particle size distribution, which may be identical for example with the aqueous starting dispersion I. Of course, the aqueous starting dispersion II to be used according to the invention can also be prepared immediately beforehand in the same polymerization vessel in which the actual process of the invention is to be carried out, whether for example by mixing different polymer dispersions in the polymerization vessel (a simple way of preparing an aqueous starting dispersion II having a broad particle size distribution) and/or by carrying out a free radical aqueous emulsion polymerization therein.

In the latter case, the process of the invention and the process for preparing the starting dispersion II can merge smoothly, in particular when the aqueous starting dispersion II is prepared employing the stream addition process, in which part of the polymerization batch is introduced as initial charge and heated to the polymerization temperature and the remainder is then added to the ongoing polymerization in a stream or spatially separate streams. If the starting dispersion II comprises essentially only polymer particles having a diameter ≦50 nm, then the mass of the starting polymer II thus added relative to the total mass formed of the mass of the at least one radical polymerizable monomer and of the mass of starting polymers I, II added in the form of aqueous starting dispersions I, II is preferably ≦5% by weight, particularly preferably from 2 to 5% by weight.

Of course, in the course of the aqueous free radical emulsion polymerization of the invention it is possible for there to be a change in the composition not only of the monomers to be added but also of the aqueous starting dispersion I to be added. Furthermore, the additions can take place not only stepwise but also continuously or by the gradient method. Preferably, the addition of the monomers to be polymerized takes place relative to the addition of the at least one aqueous starting dispersion I in such a way that V is within the range >0 to 5 at any time after the start of the aqueous emulsion polymerization of the invention. Here a continuous mode of addition is preferred not only for the monomers to be polymerized but also for the at least one aqueous starting dispersion I. It is particularly advantageous for the monomers to be polymerized and the at least one aqueous starting dispersion I to be added to be added continuously and synchronously starting at the same time and preferably finishing at the same time. Moreover, the monomers to be polymerized are advantageously added to the reaction zone in such a way that at any time of this addition the polymerization conversion of the monomers already added previously to the polymerization vessel is at least 90 mol %, particularly preferably at least 98 mol %. The monomers to be polymerized can be added not only by themselves but also preemulsified in an aqueous phase. If final aqueous polymer dispersions having a particularly high solids volume concentration are to be produced, the monomers to be polymerized are preferably added by themselves.

The addition of the free radical polymerization initiators is advantageously effected synchronously with the addition of the monomers to be polymerized. It can be effected not only via a spatially separate stream but also for example in mixture with the aqueous starting dispersion I to be added.

The initiation of the aqueous free radical emulsion polymerization of the invention can be effected for example by adding monomers to be polymerized to an initial charge that already contains polymerization initiator, after heating to the polymerization temperature, or by accompanying the addition of these monomers to be polymerized by the addition of initiator, if the initial charge heated to the polymerization temperature does not contain any initiator.

If, from the start of the free radical aqueous emulsion polymerization of the invention, surface active substances are added to the polymerization vessel in an amount exceeding the minimum amounts required in the at least one aqueous starting dispersion I, this addition is advantageously effected in such a way that at any time from the start of the free radical aqueous emulsion polymerization of the invention the amount of surface active substances contained in the polymerization vessel minus the minimum amounts of surface active substances introduced into the polymerization vessel as minimum amounts mentioned under j), k) is less than 3 % by weight, based on the monomers already added to the polymerization vessel. Preferably the addition takes place synchronously with the monomer addition.

The mass of the at least one starting polymer I added relative to the total mass formed of the mass of the at least one radical polymerizable monomer and of the mass of starting polymers I, II added in the form of aqueous starting dispersions I, II is advantageously from 2 to 10% by weight and the amount of the at least one monomer to be polymerized, expressed in the same way, is preferably at least 40, particularly preferably at least 80,% by weight.

On completion of the actual polymerization process of the invention the mixture is stirred for some additional hours while the polymerization temperature is maintained. This may be followed by customary measures for residual monomer removal, for setting a different pH or other methods of post-stabilization, including the subsequent addition of surface active substances. Of course, the various possible, generally spatially separate, feed streams can be mixed with one another immediately before entry into the polymerization vessel.

Preferred classes of final polymers are those composed
—to an extent of from 70 to 100% by weight of esters of acrylic and/or methacrylic acid with alkanols of from 1 to 12 carbon atoms and/or styrene or
—to an extent of from 70 to 100% by weight of styrene and/or butadiene or
—to an extent of from 70 to 100% by weight of vinyl chloride and/or vinylidene chloride, of which the class of the acrylates is particularly preferred and preferably comprises the following monomer compositions:

70–99% by weight of at least one ester of acrylic and/or methacrylic acid with alkanols of from 1 to 8 carbon atoms,
—1–5% by weight of acrylic acid, methacrylic acid or a mixture thereof, and
—0–25% by weight of vinyl acetate, styrene or a mixture thereof.

The free radical aqueous emulsion polymerization of the invention makes it possible to produce in a simple manner final aqueous polymer dispersions which have a very wide particle size distribution which has all the following particle size distributions.

5–30% by weight of the final polymer ≦200 nm
10–40% by weight of the final polymer ≦300 nm
20–45% by weight of the final polymer ≦400 nm
25–50% by weight of the final polymer ≦500 nm
30–65% by weight of the final polymer ≦600 nm
50–90% by weight of the final polymer ≦700 nm
80–99% by weight of the final polymer ≦800 nm
100% by weight of the final polymer ≦1000 nm.

It is presumably this specific particle size distribution which is responsible for the reduced flow resistance of the final aqueous polymer dispersions of the invention, which normally have Newtonian flow characteristics. The particle size distribution was determined in an analytical ultracentrifuge using the coupling PSD technique (see W. Mächtle, Angewandte Makromolekulare Chemie 162 (1988), 35–42 (No. 2735)); the particle size determinations on the starting dispersions having a less wide particle size distribution were likewise carried out using the analytical ultracentrifuge (cf. W. Mächtle, Makromolekulare Chemie 185 (1984), 1025–1039). Below a solids volume concentration of 50% by volume the effect of the particle size distribution on the flow resistance decreases progressively. The final aqueous polymer dispersions of the invention are generally obtained as described in an industrially readily implementable manner with solids volume concentrations of up to 75% by volume with fully satisfactory reproducibility and no flocs.

The final aqueous polymer dispersions of the invention show their advantageous properties particularly markedly at solids volume concentrations above 65 % by volume, which is why such final polymer dispersions are preferred. They are generally suitable for use as binders and as materials for preparing coatings and adhesive joints, for which purpose they may have additionally mixed into them in a conventional manner assistants such as film forming aids, fillers or plasticizers.

EXAMPLES

EXAMPLE 1

Preparation of starting dispersions III

S(IIIa): A mixture of 51.12 kg of water, 0.4 kg of a 30% strength by weight aqueous $HO_2O_2$ solution,
20.0 kg of n-butyl acrylate, and
18.8 kg of a 45% strength by weight aqueous solution of the surface active substance corresponding to Dowfax 2A1 was admixed at room temperature with 50% by weight of the feed stream defined hereinafter, which causes the polymerization to start and the temperature to rise. On attainment of a reaction temperature of 53° C. the second half of the feed stream was added continuously over 30 min while the temperature was maintained. The aqueous starting dispersion IIIa) thus obtainable had a solids content of 30.1% by weight and a weight average particle diameter of 31.8 nm resulting from an essentially monodisperse particle size distribution.

Feed stream: 4.0 kg of water
0.2 kg of ascorbic acid, and
0.01 kg of iron(II) sulfate.

S(IIIb):A mixture of 65.4 kg of water,
25.0 kg of n-butyl acrylate, and
22.25 kg of 45% strength by weight aqueous solution of the surface active substance corresponding to Dowfax 2A1
was admixed at room temperature first with a solution of 0.0625 kg of ascorbic acid and 0.005 kg of iron(II) sulfate and 2 kg of water and then in the course of 3 min with a mixture of 2 kg of water and 0.65 kg of a 30% strength by weight aqueous hydrogen peroxide solution. The temperature was then maintained at 52° C. for 1 h. Thereafter the mixture was cooled down to room temperature and following the addition of 0.05 kg of ascorbic acid in 1 kg of water additionally stirred for 2 h.

The resulting aqueous starting dispersion IIIb) had a solids content of 30.2% by weight and a virtually monodisperse particle size distribution resulting in a weight average particle diameter $\bar{d}_w$ of 32 nm.

EXAMPLE 2

Preparation of starting dispersions IV

S(IVa): A mixture of 324 g of water,
1.8 g of ascorbic acid
0.024 g of iron(II) sulfate,
12 g of 10 % strength by weight aqueous sulfuric acid, and
30 g of stream II
was heated to 85° C. and then continuously admixed, starting at the same time, with the remainder of stream II and with stream I as per the following schedule while the temperature was maintained at 85° C.:

Stream I: 2% by weight within 15 min, then
4% by weight within 15 min, then the remaining 94% by weight within 180 min.
Remainder of stream II: within 240 min. Finally 25% strength by weight aqueous ammonia solution was used to adjust the pH of the aqueous dispersing medium to 5.8.

Stream I: 494 g of water,
2352 g of n-butyl acrylate,
48 g of methacrylic acid,
0.6 g of ascorbic acid, and
137 g of a 35% strength by weight aqueous solution of the sodium salt of the sulfuric acid half-ester of ethoxylated isooctylphenol (EO degree: 25).

Stream II: 300 g of water, and 12 g of sodium peroxodisulfate. The aqueous starting dispersion IVa) thus obtainable had a solids content of 66.4% by weight and the following particle size distribution:
23% by weight $\leq 300$ nm and
77% by weight $> 300$ and $\leq 1000$ nm.

S(IVb): A mixture of 22.63 g of stream II,
42.00 g of stream III, and
300 g of water
was heated to 85° C. and, while this temperature was maintained, was continuously admixed starting at the same time with stream I (4% by weight within 30 min, then the remainder (96% by weight) within 3 h) and with the remainder of stream III (within 4 h). The remainder of stream II was continuously added within 3 h starting 30 min from the start of the addition of stream I.

Stream I: 1710 g of n-butyl acrylate,
250 g of methyl methacrylate,
40 g of methacrylic acid,
1 g of tert-dodecyl mercaptan,
50 g of a 20% strength by weight aqueous solution of ethoxylated fatty alcohols ($C_{16}$–$C_{18}$, EO degree: 18),
100 g of a 20% strength by weight aqueous solution of the surface active substance corresponding to Dowfax 2A1,
1 g of 3-mercaptopropyltrimethoxysilane, and
470 g of water.

Stream II: 13.33 g of aqueous starting dispersion IIIb) of Example 1,
5 g of a 20% strength by weight aqueous solution of the surface active substance corresponding to Dowfax 2A1,
8 g of a 25% strength by weight aqueous ammonia solution, and
200 g of water.

Stream III: 10 g of sodium peroxodisulfate in 200 g of water.

The aqueous starting dispersion IVb) thus obtainable had a solids content of 61.1% by weight and the following particle size distribution:
6% by weight $\leq 300$ nm
94% by weight $> 300$ nm and $\leq 500$ nm.

EXAMPLE 3

Preparation of final aqueous polymer dispersions according to the invention

Fa): The aqueous starting dispersion IIa) introduced as initial charge into a polymerization vessel comprised a quarter of stream I and was heated to 85°

C. Then the remainder of stream I and streams II, III were added continuously within 2 h, starting at the same time and ending at the same time, while the 85° C. were maintained. This was followed by a further hour of stirring at 85° C.

| Stream I: | SIa | 1150 g of starting dispersion IVa) of Example 2,<br>100 g of starting dispersion IIIA) of Example 1,<br>10 g of water,<br>2 g of a 20% strength by weight aqueous solution of a surface active substance corresponding to Dowfax 2A1, and<br>8 g of a 70% strength by weight aqueous solution of t-butyl hydroperoxide. |
|---|---|---|
| Stream II: | | 635 g of n-butyl acrylate. |
| Stream III: | | 1000 g of water,<br>3 g of ascorbic acid,<br>0.2 g of iron(II) sulfate, and<br>1 g of the sodium salt of ethylenediaminetetraacetic acid. |

Fb): A polymerization vessel was charged with a mixture of 2.0 g of sodium peroxodisulfate and 200 g of water and the initial charge was heated to 85° C. Then 4% by weight of stream I were added continuously within 30 min while the 85° C. were maintained to produce an aqueous starting dispersion SIIb. It was then continuously admixed within 3.5 h at 85° C. with stream II and the remainder of stream I, starting at the same time and finishing at the same time.

| Stream I: | | 1710 g of n-butyl acrylate,<br>250 g of methyl methacrylate,<br>40 g of methacrylic acid,<br>100 g of a 20% strength by weight aqueous solution of a surface active substance corresponding to Dowfax 2A1, and<br>50 g of a 20% strength by weight aqueous solution of ethoxylated fatty alcohols ($C_{16}$–$C_{18}$, EO degree: 18),<br>1 g of tert-dodecyl mercaptan<br>1 g of 3-mercaptopropyltrimethoxysilane, and<br>277 g of water. |
|---|---|---|
| Stream II: | AIb) | 3.33 g of aqueous starting dispersion IIIB) of Example 1,<br>250 g of aqueous starting dispersion IVb) of Example 2,<br>100 g of water,<br>8 g of a 25% strength by weight aqueous ammonia solution, and<br>8 g of sodium peroxodisulfate. |

Fc): As for Fb), except that in stream I the 277 g of water were increased to 292 g of water and that in stream II the 250 g of SIVb) were reduced to 166.7 g of SIVb).

Fd): As for Fb), except that in stream I the 277 g of water were increased to 307 g of water and that in stream II the 250 g of SIVb) were reduced to 83.3 g of SIVb).

The final polymer dispersions thus obtained were essentially free of flocs and are characterised in the following table (SC=solids content in % by weight, SV =solids volume concentration in % by volume, $\eta$=dynamic viscosity at 23° C. and a shear gradient of 489 $s^{-1}$ as per DIN 53 019 in mPa.s).

The particle size distribution is reported in each case in terms of the proportion (% by weight) of the final polymer whose particle diameter is nm where x is an element of the set {200, 300, 400, 500, 600, 700, 800, 1000}.

TABLE 1

|    | SC   | SV   | $\eta$ | 200 | 300 | 400 | 500 | 600 | 700 | 800 | 1000 |
|----|------|------|-----|-----|-----|-----|-----|-----|-----|-----|------|
| Fa) | 71.3 | 65.8 | 580 | 30  | 40  | 44  | 46  | 48  | 58  | 90  | 100  |
| Fb) | 72.6 | 66.7 | 750 | 9   | 17  | 30  | 37  | 65  | 90  | 95  | 100  |
| Fc) | 72.7 | 66.7 | 540 | 16  | 20  | 28  | 35  | 40  | 90  | 95  | 100  |
| Fd) | 72.2 | 66.3 | 290 | 8   | 13  | 22  | 28  | 30  | 78  | 98  | 100  |

We claim:

1. An aqueous polymer dispersion whose solids volume concentration is ≧50% by volume and which has all the following polymer particle size distributions:
   5-30% by weight of the polymer ≦200 nm
   10-40% by weight of the polymer ≦300 nm
   20-45% by weight of the polymer ≦400 nm
   25-50% by weight of the polymer ≦500 nm
   30-65% by weight of the polymer ≦600 nm
   50-90% by weight of the polymer ≦700 nm
   80-99% by weight of the polymer ≦800 nm
   100% by weight of the polymer ≦1000 nm, the polymer being formed from free radically polymerizable monomers.

2. An aqueous polymer dispersion as claimed in claim 1, wherein said aqueous polymer dispersion has a solids volume concentration of ≧65% by volume.

3. An aqueous polymer dispersion as claimed in claim 1, wherein said aqueous polymer dispersion comprises a polymer comprising:
   from 70-99% by weight of a $C_{1-8}$ alkanol ester of acrylic acid, a $C_{1-8}$ alkanol ester of methacrylic acid or a mixture thereof,
   from 1-5% by weight of acrylic acid, methacrylic acid or a mixture thereof, and
   from 0-25% by weight of vinyl acetate, styrene or a mixture thereof.

4. An aqueous polymer dispersion as claimed in claim 3, wherein said aqueous polymer dispersion has a solids volume concentration of ≧65% by volume.

5. An aqueous polymer dispersion as claimed in claim 1, further comprising at least one surface active substance of the formula I

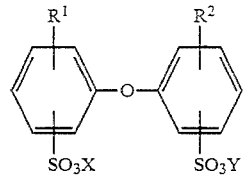

where $R^1$ and $R^2$ are each hydrogen or $C_{4-24}$-alkyl, but are not both hydrogen, and X and Y are each an alkali metal or ammonium ion.

6. An aqueous polymer dispersion as claimed in claim 5, wherein said aqueous polymer dispersion has a solids volume concentration of $\geq 65\%$ by volume.

7. An aqueous polymer dispersion as claimed in claim 1, wherein said aqueous polymer dispersion comprises a polymer comprising from 70 to 100% by weight of a $C_{1-12}$ alkanol ester of acrylic acid, a $C_{1-12}$ alkanol ester of methacrylic acid, styrene or a mixture thereof.

8. An aqueous polymer dispersion as claimed in claim 1, wherein said aqueous polymer dispersion comprises a polymer comprising from 70 to 100% by weight of styrene, butadiene or a mixture of butadiene and styrene.

9. An aqueous polymer dispersion as claimed in claim 1, wherein said aqueous polymer dispersion comprises a polymer comprising from 70 to 100% by weight of vinyl chloride, vinylidene chloride or a mixture thereof.

10. An aqueous polymer dispersion whose solids concentration is $\geq 71.3\%$ by weight and $\leq 75\%$ by volume and which has all the following polymer particle size distribution:

5–30% by weight of the polymer $\leq 200$ nm
10–40% by weight of the polymer $\leq 300$ nm
20–45% by weight of the polymer $\leq 400$ nm
25–50% by weight of the polymer $\leq 500$ nm
30–65% by weight of the polymer $\leq 600$ nm
50–90% by weight of the polymer $\leq 700$ nm
80–99% by weight of the polymer $\leq 800$ nm
100% by weight of the polymer $\leq 1000$ nm, the polymer being formed from free radically polymerizable monomers.

11. An aqueous polymer dispersion whose solids volume concentration is $\geq 65\%$ by volume and which has all the following polymer particle size distributions:

5–30% by weight of the polymer $\leq 200$ nm
10–40% by weight of the polymer $\leq 300$ nm
20–45% by weight of the polymer $\leq 400$ nm
25–50% by weight of the polymer $\leq 500$ nm
30–65% by weight of the polymer $\leq 600$ nm
50–90% by weight of the polymer $\leq 700$ nm
80–99% by weight of the polymer $\leq 800$ nm
100% by weight of the polymer $\leq 1000$ nm, the polymer being formed from free radically polymerizable monomers selected from the group consisting of acrylic acid, methacrylic acid, methyl acrylate, methyl methacrylate, ethyl acrylate, ethyl methacrylate, acrylonitrile, vinyl halides, vinylidene halides, vinyl acetate, vinyl propionate, acrylamide, methacrylamide and vinylsulfonic acid and water soluble salts thereof.

12. The aqueous polymer dispersion as claimed in claim 7, wherein said aqueous polymer dispersion has a solids volume concentration of $\geq 65\%$ by volume.

13. The aqueous polymer dispersion as claimed in claim 8, wherein said aqueous polymer dispersion has a solids volume concentration of $\geq 65\%$ by volume.

14. The aqueous polymer dispersion as claimed in claim 9, wherein said aqueous polymer dispersion has a solids volume concentration of $\geq 65\%$ by volume.

* * * * *